United States Patent
Cai et al.

(10) Patent No.: US 10,663,437 B2
(45) Date of Patent: May 26, 2020

(54) DOMAIN TRANSFORMATION METHOD FOR DISPERSIVE ULTRASONIC GUIDED WAVE SIGNAL

(71) Applicant: NANJING UNIVERSITY OF AERONAUTICS AND ASTRONAUTICS, Nanjing (CN)

(72) Inventors: Jian Cai, Nanjing (CN); Shenfang Yuan, Nanjing (CN)

(73) Assignee: NANJING UNIVERSITY OF AERONAUTICS AND ASTRONAUTICS, Nanjing (CN)

(*) Notice: Subject to any disclaimer, the term of this patent is extended or adjusted under 35 U.S.C. 154(b) by 0 days.

(21) Appl. No.: 16/345,713

(22) PCT Filed: Dec. 29, 2017

(86) PCT No.: PCT/CN2017/119826
§ 371 (c)(1),
(2) Date: Apr. 28, 2019

(87) PCT Pub. No.: WO2019/071849
PCT Pub. Date: Apr. 18, 2019

(65) Prior Publication Data
US 2019/0302064 A1   Oct. 3, 2019

(30) Foreign Application Priority Data

Oct. 12, 2017 (CN) .......................... 2017 1 0945341

(51) Int. Cl.
*G01N 29/44*   (2006.01)
*G01N 29/24*   (2006.01)
(Continued)

(52) U.S. Cl.
CPC ....... *G01N 29/4472* (2013.01); *B06B 1/0603* (2013.01); *G01N 29/048* (2013.01);
(Continued)

(58) Field of Classification Search
CPC .................................................. G01N 29/4472
See application file for complete search history.

(56) References Cited

U.S. PATENT DOCUMENTS

2006/0203086 A1* 7/2006 Pavlakovic
2009/0066727 A1* 3/2009 Lu et al.
(Continued)

FOREIGN PATENT DOCUMENTS

| CN | 102818860 A | 12/2012 |
|---|---|---|
| JP | 2007121123 A | 5/2007 |
| JP | 2010175449 A | 8/2010 |

OTHER PUBLICATIONS

Cai, Man, et al. Lamb Wave High-resolution Damage Imaging Method Based on Non-dispersive Signal Construction. Acta Aeronautica et Astronautica Sinica, Mar. 8, 2013, ISSN:1000-6893,pp. 1815-1823.vol. 34 No. 8, China Academic Journal Electronic Publishing House.

(Continued)

*Primary Examiner* — Raymond L Nimox
(74) *Attorney, Agent, or Firm* — Bayramoglu Law Offices LLC

(57) ABSTRACT

An improved domain transformation method for a dispersive ultrasonic guided wave signal, including the following steps: obtaining a dispersive wave number curve and a non-dispersive wave number curve corresponding to a mode of an ultrasonic guided wave signal; calculating an ultrasonic guided wave excitation waveform that is in distance domain and that has a reduced space width; obtaining an ultrasonic guided wave impulse response signal in distance domain; and calculating and obtaining a non-dispersive ultrasonic guided wave distance-domain signal whose resolution is enhanced.

5 Claims, 4 Drawing Sheets

(51) Int. Cl.
*B06B 1/06* (2006.01)
*G01N 29/04* (2006.01)
*G01N 29/34* (2006.01)

(52) U.S. Cl.
CPC ......... *G01N 29/2437* (2013.01); *G01N 29/34* (2013.01); *G01N 2291/023* (2013.01)

(56) References Cited

U.S. PATENT DOCUMENTS

| 2009/0301198 | A1* | 12/2009 | Sohn et al. |
| 2011/0058453 | A1* | 3/2011 | Hedl |
| 2014/0172399 | A1* | 6/2014 | Ume et al. |
| 2016/0157828 | A1* | 6/2016 | Sumi et al. |

OTHER PUBLICATIONS

Cai, Jian, et al. Lamb Wave Time-Distance Domain Mapping Method Considering Signal Waveform Correction. Chinese Journal of Scientific Instrument. May 31, 2013, pp. 1016-1021. vol. 34 No. 5, China Academic Journal Electronic Publishing House.

Yuan, Shenfang et al. Monitoring of Crack Propagation in Repaired Structures Based on Characteristics of FBG Sensors Reflecting Spectra. Spectroscopy and Spectral Analysis. Mar. 31, 2015, ISSN:1000-0593,pp. 724-728. vol. 35 No. 3, China Academic Journal Electronic Publishing House.

Cai, Jian. Lamb Research on Dispersion Compensation Methods in Lamb Wave Damage Imaging. Doctor's Theses. Jun. 5, 2014, entire document.

* cited by examiner

```
┌─────────────────────────────────────────────────────────────┐
│ obtaining a dispersive wave number curve corresponding to a │
│ mode of an ultrasonic guided wave signal                    │
└─────────────────────────────────────────────────────────────┘
                              │
                              ▼
┌─────────────────────────────────────────────────────────────┐
│ calculating an ultrasonic guided wave excitation waveform   │
│ that is in distance domain and that has a reduced space width│
└─────────────────────────────────────────────────────────────┘
                              │
                              ▼
┌─────────────────────────────────────────────────────────────┐
│ obtaining an ultrasonic guided wave impulse response signal │
│ in distance domain                                          │
└─────────────────────────────────────────────────────────────┘
                              │
                              ▼
┌─────────────────────────────────────────────────────────────┐
│ calculating and obtaining a non-dispersive ultrasonic guided│
│ wave distance-domain signal whose resolution is enhanced    │
└─────────────────────────────────────────────────────────────┘
```

DOMAIN TRANSFORMATION METHOD FOR DISPERSIVE ULTRASONIC GUIDED WAVE SIGNAL

CROSS REFERENCE TO RELATED APPLICATIONS

This application is the national phase entry of International Application No. PCT/CN2017/119826, filed on Dec. 29, 2017, which is based upon and claims priority to Chinese Patent Application No. CN201710945341.X, filed on Oct. 12, 2017, the entire contents of which are incorporated herein by reference.

TECHNICAL FIELD

The present invention relates to an improved domain transformation method for a dispersive ultrasonic guided wave signal, and belongs to the field of structural health monitoring using ultrasonic guided waves.

BACKGROUND

Structural health monitoring technologies have significant application values and wide application prospects in preventing major accidents, improving system safety, reducing economic losses, reducing system maintenance costs, and ensuing successful construction of important engineering projects of China. Ultrasonic guided waves are a kind of ultrasonic waves existing in thin plate structures, such as Lamb waves in a thin plate and ultrasonic guided waves longitudinally and transversely propagated in a pipeline. They can propagate with large distance and have high sensitives to both the inner and surface structural defects. Therefore, the ultrasonic guided waves have been widely used in structural health monitoring.

In the field of structural health monitoring using ultrasonic guided waves, high-resolution damage monitoring technologies are the focus of current researches. The resolution of damage monitoring using ultrasonic guided waves depends on the signal resolution to a large extent, and the signal resolution is directly related to the time-domain and space-domain widths of signal wave packets. In practical applications, due to the dispersive characteristic that phrase/group velocities of ultrasonic guided waves are related to frequencies, time-domain extension easily occurs on the signal wave packets, resulting in a lowered signal resolution. In another aspect, a relatively large distance-domain width of a wave packet in an ultrasonic guided wave signal is also one of main factors that affect the signal spatial resolution.

A provided time-distance domain transformation method improves the signal resolution merely by using dispersion compensation and then recompressing a signal wave packet extended by dispersion effect, without considering the influence caused by that the signal wave packet has a relatively large width in distance domain. Therefore, further improvement of the signal resolution is limited.

SUMMARY

Technical Problem

The present invention provides an improved domain transformation method for a dispersive ultrasonic guided wave signal. On the basis of dispersion compensation on a dispersive ultrasonic guided wave signal, the method further enhances the resolution of a Lamb wave signal by reducing a distance-domain width of a signal wave packet.

Technical Solution

The present invention uses the following technical solutions to resolve the technical problems thereof:

An improved domain transformation method for a dispersive ultrasonic guided wave signal, including the following steps:

(1) obtaining a dispersive wave number curve corresponding to a mode of an ultrasonic guided wave signal, where theoretically calculating, based on material parameters of a structure, or obtaining, through practical measurement by using an actuator and a sensor that are configured in the structure, an original dispersive curve $K_0(\omega)$ corresponding to the mode of an ultrasonic guided wave signal, where $\omega$ indicates an angular frequency;

(2) calculating an ultrasonic guided wave excitation waveform that is in distance domain and that has a reduced space width, where
performing frequency-domain interpolation on a spectrum of an ultrasonic guided wave excitation signal in time domain, to obtain an original ultrasonic guided wave excitation waveform $v_a(r)$ that is in distance-domain and that has a reduced space width, where r indicates a distance variant;

(3) obtaining an ultrasonic guided wave impulse response signal in distance domain, where
performing frequency-domain interpolation on a spectrum of an ultrasonic guided wave impulse response signal h(t) in time domain that is obtained in the structure, to obtain the ultrasonic guided wave impulse response signal h(r) in distance domain, where h(t) and h(r) respectively indicate the ultrasonic guided wave impulse response signal in time domain and the ultrasonic guided wave impulse response signal in distance domain, and t indicates a time variant; and (4) calculating and obtaining a non-dispersive ultrasonic guided wave distance-domain signal whose resolution is enhanced, where
calculating an ultrasonic guided wave distance-domain signal v(r) whose spatial resolution is enhanced as $v(r)=v_a(r)*h(r)$, where * indicates a convolution operation.

The calculating an ultrasonic guided wave excitation waveform that is in distance domain and that has a reduced space width in step (2) includes the following steps:
first determining a non-dispersive wave number curve $$K_{non}(\omega) = \frac{m \cdot \omega}{c_{g0}},$$

where $\omega$ indicates an angular frequency, $c_{g0}$ indicates a group velocity of the mode of an ultrasonic guided wave signal at the central frequency, m indicates a distance-domain width scale factor of an ultrasonic guided wave excitation waveform, and $m \geq 1$;

then calculating an interpolation mapping sequence $\Omega_{non}(\omega) = K_{non}^{-1}(\omega)$, where $K_{non}^{-1}(\omega)$ indicates an inverse function of $K_{non}(\omega)$;

further calculating a spectrum $V_a(\omega)=FT[v_a(t)]$ of an ultrasonic guided wave narrowband excitation signal in time domain, where $v_a(t)$ indicates the ultrasonic guided wave narrowband excitation signal in time domain, and FT[ ] indicates a Fourier transform operation; and subsequently performing frequency-domain interpolation on an excitation signal spectrum $V_a(\omega)$ according to the interpolation mapping sequence $\Omega_{non}(\omega)$, and then performing inverse Fourier transform, to calculate an ultrasonic guided wave excitation waveform $v_a(r)$ that is in distance domain and that has a reduced space width as $v_a(r)=\text{IFT}\{V_a[\Omega_{non}(\omega)]\}$, where IFT[ ] indicates the inverse Fourier transform operation.

The obtaining an ultrasonic guided wave impulse response signal in distance domain in step (3) includes the following steps:

first obtaining an ultrasonic guided wave impulse response time-domain signal h(t) by using the actuator and the sensor in the structure and through impulse or step pulse excitation, to calculate a transfer function $H(\omega)$ corresponding to the propagation of the ultrasonic guided wave signal as $H(\omega)=\text{FT}[h(t)]$;

then adjusting $K_0(\omega)$ to $K_1(\omega)=K_0(\omega)-K_0(\omega_0)+K_{non}(\omega_0)$, where $\omega_0$ indicates a central angular frequency, $K_0(\omega_0)$ indicates a value of a wave number of an original dispersive curve $K_0(\omega)$ at $\omega_0$, and $K_{non}(\omega_0)$ indicates a value of a wave number of a non-dispersive wave number curve $K_{non}(\omega)$ at $\omega_0$;

further calculating an interpolation mapping sequence $\Omega(\omega)=K_1^{-1}(\omega)$, where $K_1^{-1}(\omega)$ indicates an inverse function of $K_1(\omega)$, and $K_1(\omega)$ indicates a new dispersive wave number curve obtained after the $K_0(\omega)$ is adjusted; and subsequently performing frequency-domain interpolation on the transfer function $H(\omega)$ according to the interpolation mapping sequence $\Omega(\omega)$, and then performing inverse Fourier transform, to calculate the ultrasonic guided wave impulse response signal h(r) in distance domain as $h(r)=\text{IFT}\{H[\Omega(\omega)]\}$.

Advantageous Effect

Advantageous effects of the present invention are as follows:

(1) On the basis of performing signal-domain-transformation dispersion compensation on the ultrasonic guided wave signal, to recompress an original dispersion-extended wave packet of the ultrasonic guided wave signal, the present invention reduces a space width of a wave packet in an ultrasonic guided wave distance-domain signal by reducing a distance-domain scale of the excitation waveform. As a result, the resolution of the ultrasonic guided wave signal can be further improved.

(2) A distance-domain location of the wave packet in the high resolution ultrasonic guided wave distance-domain signal finally obtained in the present invention is consistent with an actual propagation distance of the wave packet, facilitating subsequent signal analysis and processing.

BRIEF DESCRIPTION OF THE DRAWINGS

FIG. 1 is an implementation flowchart of an improved domain transformation method for a dispersive ultrasonic guided wave signal provided in an embodiment.

DETAILED DESCRIPTION OF THE EMBODIMENTS

To make the objectives, technical solutions, and advantages of the present invention clearer, the following clearly and completely describes the technical solutions of the present invention through implementations with reference to the accompanying drawings in the embodiments of the present invention. Apparently, the described embodiments are some but not all of the embodiments of the present invention. All other embodiments obtained by a person of ordinary skills in the art based on the embodiments of the present invention without creative efforts shall fall within the protection scope of the present invention.

In this embodiment, a typical ultrasonic guided wave, that is, an $A_0$ mode Lamb waves propagating in an LY21 aluminum plate structure is used as a research object. A dimension of the aluminum plate is 1200 mm×1000 mm×1.5 mm. The plate material parameters are listed in table 1.

TABLE 1

| Material parameters of the aluminum plate | | | |
|---|---|---|---|
| Thickness d (mm) | Density ρ (kg/m³) | Poisson's ratio μ | Elasticity modulus E (GPa) |
| 1.5 | 2780 | 0.33 | 73.1 |

Figure 2:
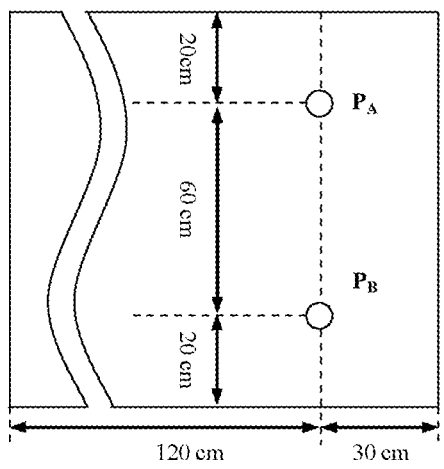
FIG. 2 is a schematic diagram of arrangement of piezoelectric wafers in an aluminum plate structure.
Figure 3:
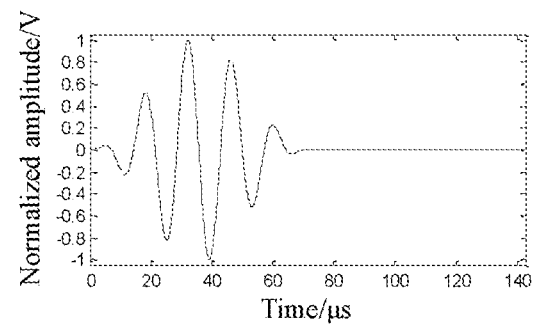
FIG. 3 is a diagram of a Lamb wave narrowband excitation signal.

Two piezoelectric wafers $P_A$ and $P_B$ are configured in the aluminum plate structure to respectively serve as an actuator and a sensor, as shown in FIG. 2. A five-peak sinusoidal modulated signal with a central frequency of 70 kHz is selected as a narrowband excitation signal $v_a(t)$, as shown in FIG. 3.

Figure 4:
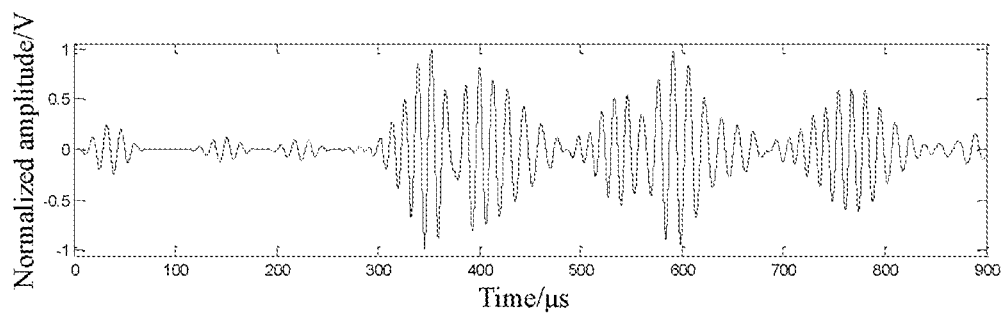
FIG. 4 is a diagram of an original dispersive $A_0$ mode Lamb wave sensor signal.

The narrowband excitation signal is generated with $P_A$. An $A_0$ mode Lamb wave sensor signal v(t) is collected by the sensor $P_B$, as shown in FIG. 4. It can be seen that due to dispersion and the resolution limitation of wave packets in the signal, the wave packets in the signal are no longer five-peak sinusoidal modulated signals, and extension and overlapping occur on all the wave packets, resulting in a relatively low resolution.

An improved domain transformation method for a dispersive ultrasonic guided wave signal according to this embodiment includes the following steps:

(1) Obtaining a dispersive wave number curve corresponding to a mode of an ultrasonic guided wave signal.

Figure 5:
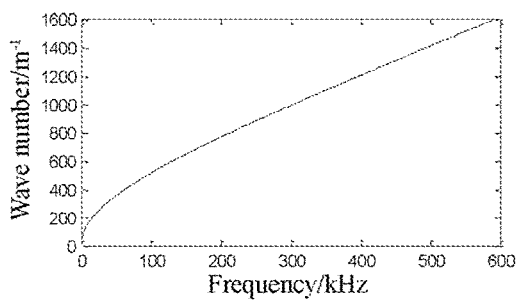
FIG. 5 is a diagram of an original dispersive wave number curve of $A_0$ Lamb wave mode that is obtained through calculation.

An original dispersive wave number curve $K_0(\omega)$ of $A_0$ mode is obtained through a theoretical calculation by using the material parameters of the aluminum plate in table 1, as shown in FIG. 5.

(2) Calculating an ultrasonic guided wave excitation waveform that is in distance domain and that has a reduced space width.

First, a group velocity $c_{g0}$ of $A_0$ mode at the central frequency of 70 kHz is measured as 1933.5 m/s, a distance-domain width scale factor m is set to 2, and $K_{non}(\omega)$ is obtained through calculation based on $$K_{non}(\omega) = \frac{m \cdot \omega}{c_{g0}}.$$

Figure 6:
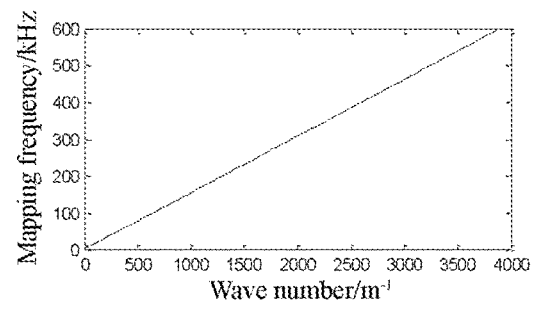
FIG. 6 is a diagram of an interpolation mapping sequence for the frequency-domain interpolation performed on a Lamb wave narrowband excitation signal spectrum.

Then, an interpolation mapping sequence $\Omega_{non}(\omega)$ is obtained through calculation based on $\Omega_{non}(\omega)=K_{non}^{-1}(\omega)$, as shown in FIG. 6.

Figure 7:
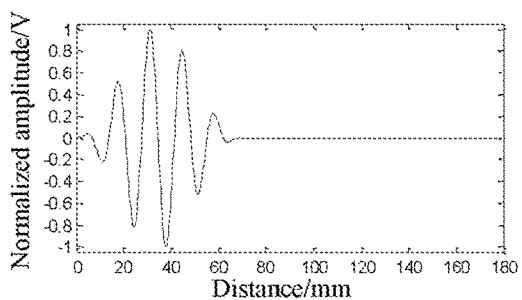
FIG. 7 is a diagram of a Lamb wave narrowband excitation signal that is in distance domain and that has a reduced space width.

Subsequently, Fourier transform is performed on the narrowband excitation signal $v_a(t)$, to obtain a narrowband excitation signal spectrum $v_a(\omega)$. Based on a formula $v_a(r)$ =IFT{$V_a[\Omega_{non}(\omega)]$}, frequency-domain interpolation is first performed on the excitation signal spectrum $V_a(\omega)$ according to the interpolation mapping sequence $\Omega_{non}(\omega)$, and then inverse Fourier transform is performed, to calculate the ultrasonic guided wave excitation waveform $v_a(r)$ that is in distance domain and that has a reduced space width, as shown in FIG. 7.

Figure 8:
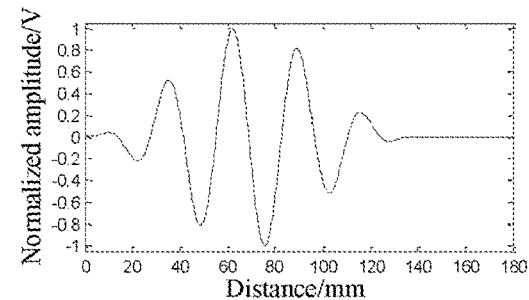
FIG. 8 is a diagram of a Lamb wave narrowband excitation signal that is in distance domain and that has an unchanged space width.

FIG. 8 shows an ultrasonic guided wave excitation waveform $v'_a(r)$ that is in distance domain and that has an unchanged space width, where the excitation waveform is obtained through calculation when m=1. It can be seen by comparing FIG. 7 and FIG. 8 that a distance-domain width of $v_a(r)$ is half that of $v'_a(r)$, and a spatial resolution of the wave packet is also doubled accordingly.

(3) Obtaining an ultrasonic guided wave impulse response signal in distance domain.

Figure 9:
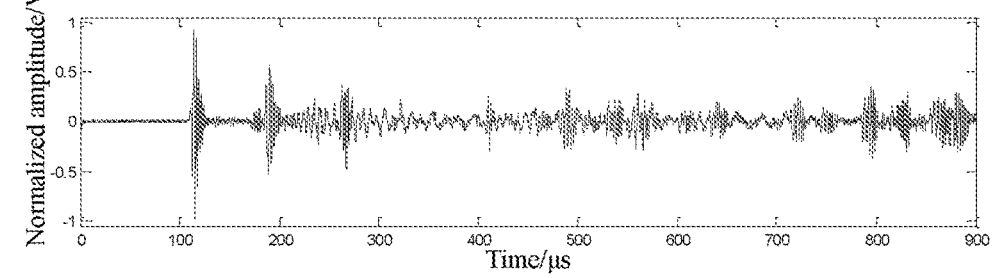
FIG. 9 is a diagram of a Lamb wave impulse response time-domain signal.

First, the impulse excitation signal is generated with $P_A$, and an impulse response time-domain signal h(t) is collected by $P_B$, as shown in FIG. 9. Fourier transform is performed on h(t) to obtain a transfer function H(ω) corresponding to the propagation of a Lamb wave signal.

Figure 10:
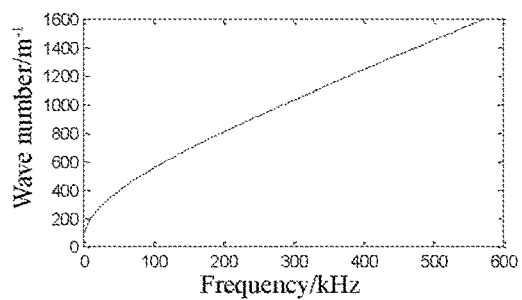
FIG. 10 is a diagram of an adjusted dispersive wave number curve of an $A_0$ Lamb wave mode.
Figure 11:
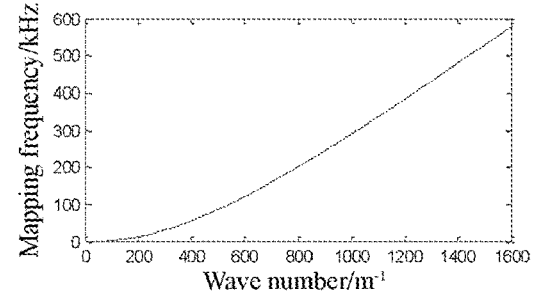
FIG. 11 is a diagram of an interpolation mapping sequence obtained based on an adjusted dispersive wave number curve of an $A_0$ Lamb wave mode.

Subsequently, $K_0(\omega)$ is adjusted to $K_1(\omega)=K_0(\omega)-K_0(\omega_0)+K_{non}(\omega_0)$, and a wave number curve $K_1(\omega)$ obtained after the adjustment is shown in FIG. 10. An interpolation mapping sequence $\Omega(\omega)$ is obtained through calculation based on $\Omega(\omega)=K_1^{-1}(\omega)$, as shown in FIG. 11.

Figure 12:
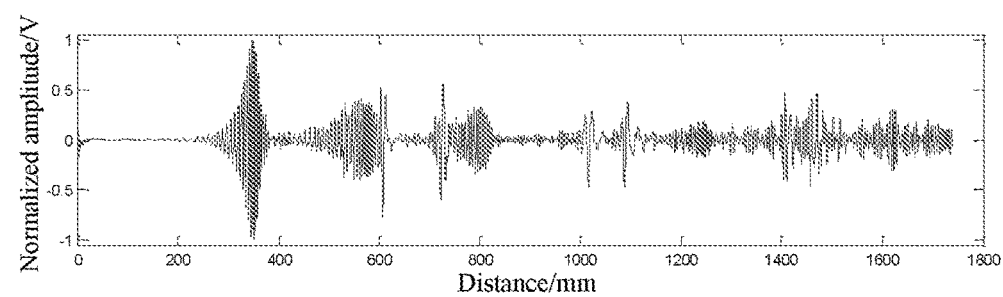
FIG. 12 is a diagram of a Lamb wave impulse response distance-domain signal.

Based on a formula $h(r)$=IFT {$H[\Omega(\omega)]$}, frequency-domain interpolation is first performed on the transfer function H(ω) according to the interpolation mapping sequence $\Omega(\omega)$, and then inverse Fourier transform is performed, to calculate the ultrasonic guided wave impulse response signal h(r) in distance domain, as shown in FIG. 12.

(4) Calculating and obtaining a non-dispersive ultrasonic guided wave distance-domain signal whose resolution is enhanced.

Figure 13:
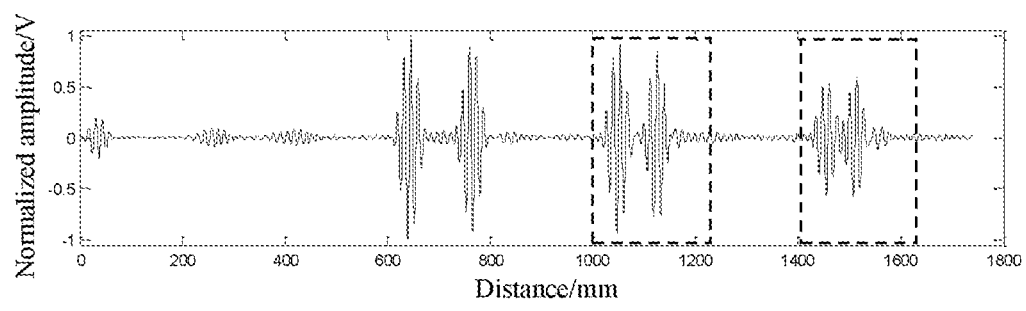
FIG. 13 is a diagram of a non-dispersive $A_0$ mode Lamb wave distance-domain signal whose wave-packet space width is reduced.
Figure 14:
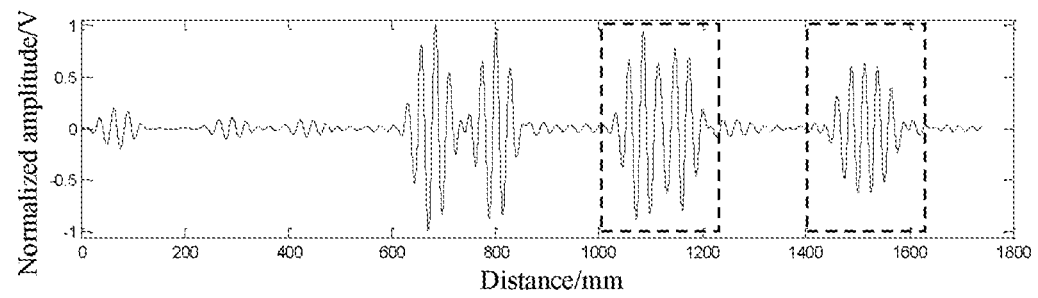
FIG. 14 is a diagram of a non-dispersive $A_0$ mode Lamb wave distance-domain signal whose wave-packet space width is unchanged.

A non-dispersive ultrasonic guided wave distance-domain signal v(r) whose wave-packet space width is reduced is finally obtained through calculation based on a formula $v(r)=v_a(r)*h(r)$, as shown in FIG. 13. FIG. 14 shows a non-dispersive ultrasonic guided wave distance-domain signal v'(r) whose wave-packet space width is unchanged, where the signal is obtained through calculation based on a formula $v'(r)=v'_a(r)*h(r)$. Compared with the original dispersive $A_0$ mode sensor signal v(t) in FIG. 4, all the wave packets in v(r) and v'(r) are recompressed due to dispersion compensation. Because a space width of a wave packet in v'(r) is not reduced, severe overlapping occurs on the adjacent wave packets in v'(r) that have much close distance-domain locations, and the wave packets cannot be distinguished, as shown in two dashed boxes in FIG. 14. Because a space width of a wave packet in v(r) is halved, the adjacent wave packets in v(r) are obviously separated, and a location of the wave packet is consistent with a propagation distance, as shown in two dashed boxes in FIG. 13. It indicates that on the basis of recompressing an original dispersion-extended wave packet of the ultrasonic guided wave signal, the improved domain transformation dispersion compensation method for an ultrasonic guided wave signal provided in the present invention further improves the resolution of the ultrasonic guided wave signal by reducing the space width of the wave packet in the non-dispersive ultrasonic guided wave distance-domain signal, thereby further facilitating subsequent signal analysis and extraction of damage features.

A basic principle of the present invention is first transforming a dispersive ultrasonic guided wave signal from time domain to distance domain, so as to compensate the dispersion effect, thereby recompressing an original dispersion-extended wave packet in time domain, and improving the time-domain resolution of the wave packet. On this basis, by reducing a distance scale of an ultrasonic guided wave excitation waveform, the distance-domain widths of non-dispersive wave packets in the ultrasonic guided wave distance-domain signal are reduced, thereby further improving the spatial resolution of the signal.

What is claimed is:

1. An improved domain transformation method for a dispersive ultrasonic guided wave signal, comprising the following steps:

(1) obtaining a dispersive wave number curve corresponding to a mode of an ultrasonic guided wave signal, wherein theoretically calculating, based on material parameters of a structure, or obtaining, through practical measurement by using an actuator and a sensor configured in the structure, an original dispersive curve $K_0(\omega)$ corresponding to the mode of the ultrasonic guided wave signal, wherein ω is an angular frequency;

(2) calculating an ultrasonic guided wave excitation waveform in distance domain and having a reduced space width, performing a first frequency-domain interpolation on a spectrum of an ultrasonic guided wave excitation signal in a time domain to obtain the original ultrasonic guided wave excitation waveform $v_a(r)$ in distance domain and having a reduced space width, wherein r is a distance variant;

(3) obtaining an ultrasonic guided wave impulse response signal in a distance domain, performing a second frequency-domain interpolation on a spectrum of an ultrasonic guided wave impulse response signal h(t) in the time domain obtained in the structure, to obtain the ultrasonic guided wave impulse response signal h(r) in the distance domain, wherein h(t) and h(r) are respectively the ultrasonic guided wave impulse response signal in time domain and the ultrasonic guided wave impulse response signal in the distance domain, and t is a time variant; and (4) calculating and obtaining a non-dispersive ultrasonic guided wave distance-domain signal having an enhancing resolution, calculating an ultrasonic guided wave distance-domain signal v(r) having an enhancing spatial resolution as v(r)=$v_a$(r)*h(r), wherein * is a convolution operation.

2. The improved domain transformation method according to claim 1, wherein the actuator in step (1) is a piezoelectric wafer $P_A$.

3. The improved domain transformation method according to claim 1, wherein the sensor in step (1) is a piezoelectric wafer $P_B$.

4. The improved domain transformation method for a dispersive ultrasonic guided wave signal according to claim 1, wherein the step of calculating the ultrasonic guided wave excitation waveform in the distance domain and having the reduced space width in step (2) comprises the following steps:

first determining a non-dispersive wave number curve $$K_{non}(\omega) = \frac{m \cdot \omega}{c_{g0}},$$

wherein ω is an angular frequency, $c_{g0}$ is a group velocity of the mode of the ultrasonic guided wave signal at a central frequency, m is a distance-domain width scale factor of an ultrasonic guided wave excitation waveform, and m≥1;

then calculating an interpolation mapping sequence $\Omega_{non}(\omega)$=$K_{non}^{-1}(\omega)$ wherein $K_{non}^{-1}(\omega)$ is an inverse function of $K_{non}(\omega)$;

further calculating a spectrum $V_a(\omega)$=FT[$v_a$(t)] of the ultrasonic guided wave narrowband excitation signal in the time domain, wherein $v_a$(t) is the ultrasonic guided wave narrowband excitation signal in the time domain, and FT[ ] is a Fourier transform operation; and subsequently performing a third frequency-domain interpolation on the spectrum $V_a(\omega)$ of the narrowband excitation signal according to the interpolation mapping sequence $\Omega_{non}(\omega)$, and then performing an inverse Fourier transform to calculate the ultrasonic guided wave excitation waveform $v_a$(r) in the distance domain and having the reduced space width as $v_a$(r)=IFT{$V_a$[$\Omega_{non}(\omega)$]}, wherein IFT[ ] is an inverse Fourier transform operation.

5. The improved domain transformation method according to claim 1, wherein the step of obtaining the ultrasonic guided wave impulse response signal in the distance domain in step (3) comprises the following steps:

first obtaining an ultrasonic guided wave impulse response time-domain signal h(t) by using the actuator and the sensor in the structure and through an impulse or a step pulse excitation, and calculating a transfer function H(ω) corresponding to the propagation of the ultrasonic guided wave signal as H(ω)=FT[h(t)];

then adjusting $K_0(\omega)$ to $K_1(\omega)$=$K_0(\omega)$−$K_0(\omega_0)$+$K_{non}(\omega_0)$, wherein $\omega_0$ is a central angular frequency, $K_0(\omega_0)$ is a value of a wave number of an original dispersive curve $K_0(\omega)$ at $\omega_0$, and $K_{non}(\omega_0)$ is a value of a wave number of a non-dispersive wave number curve $K_{non}(\omega)$ at $\omega_0$;

further calculating an interpolation mapping sequence $\Omega(\omega)$=$K_1^{-1}(\omega)$, wherein $K_1^{-1}(\omega)$ is an inverse function of $K_1(\omega)$, and $K_1(\omega)$ is a new dispersive curve obtained after the $K_0(\omega)$ is adjusted; and subsequently performing a fourth frequency-domain interpolation on the transfer function H(ω) according to the interpolation mapping sequence $\Omega(\omega)$, and then performing inverse Fourier transform, to calculate the ultrasonic guided wave impulse response signal h(r) in the distance domain as h(r)=IFT{H[$\Omega(\omega)$]}.

* * * * *